(12) United States Patent
Roth

(10) Patent No.: US 7,121,002 B1
(45) Date of Patent: Oct. 17, 2006

(54) HEAT EXCHANGER

(76) Inventor: Max Roth, Rationen-Saarfall, CH-7310 Bad Ragaz (CH)

( * ) Notice: Subject to any disclaimer, the term of this patent is extended or adjusted under 35 U.S.C. 154(b) by 420 days.

(21) Appl. No.: 10/049,862

(22) PCT Filed: Aug. 16, 2000

(86) PCT No.: PCT/CH00/00434

§ 371 (c)(1),
(2), (4) Date: Feb. 19, 2002

(87) PCT Pub. No.: WO01/14080

PCT Pub. Date: Mar. 1, 2001

(30) Foreign Application Priority Data

Aug. 20, 1999 (CH) .................. CH11999 1526/99

(51) Int. Cl.
*B21D 53/04* (2006.01)
*F28F 3/14* (2006.01)

(52) U.S. Cl. .................. 29/890.039; 165/170

(58) Field of Classification Search ............... 165/170, 165/157, 166, 175, 179; 29/890.039, 890.04, 29/890.053, 421.1
See application file for complete search history.

(56) References Cited

U.S. PATENT DOCUMENTS

| | | | |
|---|---|---|---|
| 3,425,113 A * | 2/1969 | Ward, Jr. .................. | 228/173.7 |
| 3,757,855 A * | 9/1973 | Kun et al. .................. | 165/166 |
| 3,774,678 A * | 11/1973 | Glorisi .................. | 165/76 |
| 3,781,971 A * | 1/1974 | Middleton .................. | 228/116 |
| 4,093,024 A * | 6/1978 | Middleton .................. | 165/170 |
| 4,531,279 A * | 7/1985 | Gunter .................. | 29/509 |
| 4,550,694 A * | 11/1985 | Evans .................. | 123/41.02 |
| 4,893,669 A * | 1/1990 | Kashiwada et al. ......... | 165/282 |
| 4,997,031 A * | 3/1991 | Kashiwada et al. ......... | 165/282 |

* cited by examiner

*Primary Examiner*—Tho Duong
(74) *Attorney, Agent, or Firm*—Buchanan Ingeroll & Rooney (57) ABSTRACT

This invention relates to a heat exchanger which is produced by connecting two walls together at a plurality of points by compression molding and sealing the edges thereof.

6 Claims, 5 Drawing Sheets

HEAT EXCHANGER

FIELD OF THE INVENTION

The invention relates to a method for producing a heat exchanger with a flow-through chamber for a heat transfer medium, in which two walls are disposed opposite one another and joined to make a hollow body through which a medium can flow. The invention also relates to a heat exchanger with two walls, facing one another and joined together, and with a flow-through chamber between them for a heat transfer medium, and to the use of a method for punctate connection of two metal sheets resting over a large area on one another.

PRIOR ART

For pumping the medium, in heat exchangers in overpressure of approximately $1.5*10^5$ Pa is used. Heat exchangers with a relatively high throughput must be capable of withstanding such an overpressure, or an even higher one. In powerful heat exchangers, pipes for carrying the medium are therefore often used, and laminations or sheet-metal faces are fastened to these pipes. Over the pipe surface but above all over these sheet-metal faces or laminations fastened to it, the heat exchange takes place between the medium in the interior of the heat exchanger and the medium surrounding the heat exchanger.

Since the heat transfer paths and the heat transfers between the sheet-metal faces and the pipe carrying the medium impair the capacity of a heat exchanger, many attempts have been made to put heat exchanger faces with the greatest possible surface area into direct contact with the media on both sides. This is especially true for all flat heat exchangers. Flat heat exchangers have a flow-through chamber for a heat transfer medium which is relatively flat in form. The problem in flat heat exchangers, which have a wall with the largest possible surface area in contact with the media on the inside and the outside but the smallest possible internal volume, is the pressure difference between the internal pressure and the external pressure. This difference has to be absorbed by a more or less flat-surfaced wall. The two walls extending approximately parallel are pressed apart by an elevated internal pressure. They must therefore be joined together at many points inside the surface between the edges of the flat heat exchanger. The tensile stress on the connecting points is considerable. For connecting metal sheets in a way that absorbs this tensile stress, until now practically only welding could be considered.

Flat heat exchangers made of steel are available on the market that are made from two preshaped walls spot-welded to one another. This production process requires steel or special steel (ferrous metals) as material. However, ferrous metals are not optimal heat conductors. If flat heat exchangers are to be produced from copper, which in terms of heat conduction is the ideal material, recourse must be had to riveting and soldering. Riveting, however, has the disadvantage that both metal sheets are perforated at the riveting points, and tightness at these points is attainable, if at all, only at great effort and expense. Leaks are quite likely later on as well, for instance from thermal expansion and contraction of the metal sheets. It is almost impossible to make soft-soldered points inside the surface of the heat exchanger, and they withstand only very slight tensile stresses. Hard soldering, conversely, anneals the material and makes it even softer.

A compression-molded connection (such as TOX connection) is known with which metal sheets of all kinds can be joined together. Primarily, this compression-molded connection replaces spot welding in the automotive industry, but it also replaces riveting in aircraft construction. By an upsetting-pressing operation, metal sheets are joined absolutely tightly and without surface damage or penetration. With a simple round male die, the sheets to be joined are first pressed together into a female die. Upon a further buildup of force, the material toward the male die is forced, inside the material toward the female die, to flow outward behind the material toward the female die. This is made possible in that the positively displaced material in the female die is given a free space in the female die into which it can escape. Advantageously, such a connection point can even be pressed flat again. Similar positive-engagement compression-molded connections are also achieved using a modified technique.

Such compression-molded connections are used to join metal sheets, resting flatly on one another, together in such a way that enough shear tensile force can be absorbed by the connection. Accordingly, the sheets cannot be detached from one another by tension in the plane of the sheets. Extraction forces of the compression-molded connections perpendicular to the plane of the sheets are hardly known. In copper sheets, extraction forces are entirely unknown. Professionals in the field consider the joining of copper sheets by means of standard compression-molded connections to be unstable. The standard compression-molded connection is circular and is offered in diameter sizes of 3, 4, 5, 6, 8, 10 and 12 mm. It is recommended with the largest possible diameter that space conditions allow be selected in each case.

OBJECT OF THE INVENTION

It is now the object of the invention to propose a method for producing heat exchangers, by which method a connection of the two walls is attained that can withstand an overpressure of the internal pressure, prevailing in a chamber between the walls, of up to 4, 6 or 10 times $10^5$ Pa, for instance. Furthermore, the method should offer the capability especially of also using copper and other nonferrous metals for the walls to be joined. The production of heat exchangers should be as economical as possible, and in terms of shape and choice of material the heat exchangers should be capable of being designed for the most various fields of use.

DESCRIPTION OF THE INVENTION

According to the invention, this is attained in that to fasten the walls to one another inside the surface between the edges of the heat exchanger, the walls are made to mesh with one another by deformation of the material. The meshing by positive engagement is accomplished merely by means of an upsetting-pressing operation, without injuring the wall or making a damaging change to the structure of the material. Subsequently both walls remain free of apertures or cracks, so that even loosening of the connecting point need not cause any leakage. Such denticulations can be made linearly on the order of profile sections, given a sufficient material thickness of the wall.

The material deformation is preferably done in punctate form. The term "punctate material deformation" is understood to mean that the material is deformed at an approximately circular place having a diameter of between 2 and 15 mm, and preferably between 3 and 8 mm, depending on the material thickness of the walls to be joined and on the stress to be expected. At a wall thickness of approximately 0.5 mm and with a pressure difference between the internal pressure and the external pressure of less than $4*10^5$ Pa, a compression molding point diameter of 5 or 6 mm is preferred. Instead of a circular shape, the deformation of the wall can also have a polygonal or oval shape. After the common deformation has occurred, the material comprising one wall surrounds what is then annular material of the other wall from behind. This kind of circular or punctate compression-molded connection withstands an astonishing tensile stress perpendicular to the plane of the sheet. The reason why this is so is unknown. However, it can be suspected that upon tensile stress on the compression-molded connection at the deformed points, an annular tensile stress occurs in one wall while an annular compressive stress occurs in the other. It is suspected that thanks to the annular structure of the compression-molded connection, a very high stress can build up in the deformed parts without the material comprising the wall being deformed under the influence of the superelevated internal pressure to the extent that the connection comes loose. With sheet copper 0.55 to 0.65 mm in thickness, a maximum tensile stress of about 40 kg per punctate compression-molded connection with an outside diameter of 6 mm results. The thickness of the two sheets together is compressed down to a thickness of 0.35 to 0.45 mm for that purpose.

Advantageously, a highly conductive metal, especially copper, is used for the wall. In certain cases, such as in solar collectors, which always have to absorb heat on only one side, the walls are under some circumstances advantageously made of different materials. This makes it possible to use one material of high thermal conductivity on one side and another material of low thermal conductivity on the other side and still join the two together. Even the use of plastic should not be precluded.

The use of heat exchangers comprising two independent metal sheets or one sheet lock-seamed together has the advantage that an endless web can be manufactured. The sheet-metal web can be shaped before being joined. One or both edges extending longitudinally of the web can be joined and closed in a conventional way, such as lock-seaming and soldering.

The sheet or sheets that form the walls to be joined are advantageously preshaped before being joined. A circular indentation at the points of the compression-molded connections has proved an advantageous deformation of the sheet. The indentation has a somewhat larger diameter than the compression-molded connection and defines the spacing of the two walls and therefore also defines the cross section of the flat heat exchanger through which a medium can flow. However, the indentation also reinforces the wall in the region of the compression-molded connections. Thanks to this reinforcement, the connecting points are subjected by the internal pressure only to tension perpendicular to the plane of the sheet. The reinforcement indentations prevent the sheets from warping at the edge of the compression-molded connections. Such warping of the sheet wall immediately after the compression-molded connection would mean that the meshing of the two walls could come loose in response to a scaling process. Because of the reinforcing indentation, the load on the compression-molded connections is symmetrical.

If sheet copper is used, the faces located in the indentations can be treated in such a way that the material gains in stiffness. This treatment is done by rubbing the faces before joining the walls. In addition or as an alternative, the material is also reinforced by moving the indented faces, by subjecting the internal pressure in the heat exchanger to fluctuations. The copper can also be reinforced in a purposeful way by heat/cold treatment.

These indentations are advantageously made in both walls and placed as exactly as possible back-to-back to one another. At a compression molding point of 5 or 6 mm in diameter, the indentations have a diameter of 8 to 10 mm. They are from 1 to 1.5 mm deep. This creates a flow-through chamber that is 2 to 3 mm thick. For larger dimensions of the flow-through chamber, the depths of the indentations should be adapted accordingly. The indentations are made to match by providing a sheet-metal strip with a linearly symmetrical arrangement of indentations and then folding it together along the axis of symmetry. Alternatively, two sheets provided symmetrically with indentations are placed on one another with the reinforced points.

Advantageously, the heat exchanger is soldered annularly all the way around before the compression-molded connection is made. As a result, the change in length of the sheet (with copper, the expansion is in the range of 1.3 to 1.5 mm per 100° C. of temperature difference and running meter) as a consequence of material heating up to 270° C. in soldering can be prevented from causing separations of peripheral compression-molded connections.

Two opposed side edges of the flat heat exchanger are expediently lock-seamed for longitudinal reinforcement, and at least one of them is closed by soldering. The other two opposed end edges serve as connection sides for the heat transfer medium. These edges are advantageously equipped with an end pipe of the same metal that comprises the wall. To that end, the wall sheets are drawn or compressed into shape in channel-like fashion and wrapped around an end pipe provided with slots or bores. The slots or bores are aligned with the flow-through chamber, so that the interior of the end pipe communicates with the flow-through chamber of the heat exchanger. After that, the end pipe and the sheet-metal wall are soldered to one another. An immersion soldering process is suitable for this purpose. The end pipe is expediently gripped by the sheet-metal walls over at least half of its circumference, and as a result the pipe is clamped between the two face ends, preshaped in quarter-round shape, of the walls.

So that the corners of the hollow body will connect tightly to the end pipe and be securely sealed by the immersion soldering, an opening, to be disposed on the corner of the hollow body, of the end pipe is advantageously provided with a collar that extends into the flow-through chamber. The collar can be drawn out from the pipe wall material. Alternatively, a part of the end pipe that protrudes laterally past the hollow body can also be shaped around the edge of the hollow body from outside. This makes it possible to place the openings at a spacing from the edge of the hollow body, which in turn makes it possible to insert plug connections into the end pipe that do not extend past the width of the hollow body.

The end pipe ends covered with solder after the immersion soldering are then rubbed clean, and their internal diameter is brought exactly to a certain dimension. This dimension is adapted to the external size of a connecting piece that is introduced, with one or more, preferably two, sealing O-rings, into the end pipe end. An arrangement in which the connecting piece surrounds the end pipe end is also conceivable. It is also possible for the end pipe to be provided with T-pieces somewhere along its length. These pieces can also be coupled to pipes or other components of a system using plug connections.

Connecting system components by means of plug connections makes construction easier and enables fast assembly, as well as the use of such standard parts as angle pieces and other fittings, and uncomplicated adaptation of an existing system. A construction kit, for instance with five flat heat exchanger elements and a collector area of one square meter, is advantageously equipped with plug connectors. This makes do-it-yourself assembly easier and allows even temporary installation of a collector system, for instance in a mobile home or camper. For transportation, for instance when traveling onward in an RV, this system can be removed quickly and its individual parts can be stowed. Such construction kits can advantageously be supplemented with a collector system frame, a pump, a hot-water tank, and in any case an expansion vessel.

In a heat exchanger with two joined-together walls and between them a flow-through chamber for a heat transfer medium, according to the invention the walls inside the surface between the edges of the heat exchanger are made to mesh with one another at many points with deformations of the walls and are thereby fastened to one another.

The deformations of the walls are advantageously punctate. Such compression-molded connections are expediently arranged in rows. They are advantageously disposed in a mutual spacing of 10 to 50 mm, preferably between 20 and 30 mm. The smaller the spacing, the smaller the wall area that has to be held together by the compression-molded connection, and the less tensile stress the connection has to withstand. The more the internal pressure exceeds the external pressure, the closer together must the compression-molded connections accordingly be disposed. The sheet-metal thickness also has an influence on the advantageous distance between connecting points. The thinner the sheet metal, the closer together the connecting points have to be disposed in order to counteract deformation of the sheet under the operating load.

Advantageously, at least one wall of the heat exchanger comprises sheet copper, especially in a thickness of 0.3 to 0.8 mm and preferably 0.5 to 0.65 mm. Sheet copper is the ideal heat conductor and until now cannot be joined superficially, permanently and economically, in any way but that of the present invention.

Expediently, the punctate deformations are disposed in a grid pattern. The grid can be a triangular grid, square grid, or rectangular grid. In a triangular grid, especially with equilateral triangles, the spacings between adjacent fastening points are more uniform than in rectangular grids. The forces in the metal sheet are also distributed more uniformly, even in comparison with the force distribution in a metal sheet with fastening points in a square grid.

The heat exchanger advantageously has circular indentations with a diameter of between 6 and 15 mm and advantageously between 8 and 10 mm in the walls. These indentations are from 0.5 to 3 mm and advantageously 1 to 1.5 mm deep and are shaped identically and opposite one another in the two walls. The indentations face one another, so that the walls can be kept at a spacing from one another around these indentations that is equivalent to the sum of the two depths of the indentations. The indentations in opposed walls can be embodied with different depths, but expediently they are embodied with uniform depths. These indentations are highly advantageous, regardless of how the two sheet-metal walls are joined. Thanks to these reinforcing indentations, the remaining surface of the heat exchanger hardly bulges in response to pressure.

Thanks to these indentations, the remaining surfaces of the wall remain practically flat-faced, even if the heat exchanger is under pressure or is subjected to temperature fluctuations. This makes it possible to dispose a photovoltaic film on one wall of the flat heat exchanger. Because it is cooled by the heat transfer medium in the interior of the flat heat exchanger, this photovoltaic film operates at constant efficiency even in the presence of high radiant heat input.

The heat exchanger has two opposed closed side edges, which extend parallel to the flow direction. Connections for forward and reverse flow are provided on the other two edges. The connection on the face end of the heat exchanger is advantageously formed by an end pipe that has a standard cross section. The end pipe is open on its ends, and toward the flow-through chamber of the heat exchanger it is provided with openings. These openings are formed by notches or bores and advantageously have collars, which especially at the corners of the hollow body tightly adjoin the walls.

According to the invention, to produce heat exchangers through which a medium can flow, a method for joining two parallel metal sheets by common punctate compression molding of the sheets is therefore employed. The use of this method has the advantage that the starting material comprising the sheets is not impaired in its structure or destroyed. The sheet remains unharmed, and thus the tightness of the connecting point remains assured. Even with soft metal sheets, such as copper, compared to such conventional connections as soldering, the connection surprisingly withstands multiple times the tensile forces perpendicular to the surfaces of the sheets, so that a void between the sheets can be put under pressure. The most various flat structures with a hollow space in them through which a medium can flow can therefore be made of sheet copper. It is possible to produce roof tiles or entire roofing strips, heat exchangers for crystallizers or distilling systems of platinum or other catalytic metals, or cooling surfaces or surfaces that output waste heat for air conditioners, to name only a few applications.

In a method for producing a heat exchanger having a flow-through chamber for a heat transfer medium, in which two walls, are disposed facing one another and are joined together to make a hollow body capable of experiencing a flow through it, and the walls are fastened to one another at a plurality of connecting points inside the surface between the edges of the hollow body, it has proved highly advantageous, regardless of the type of connection, that in at least one and preferably both walls at the connecting points inside the surface between the edges of the hollow body, circular indentations that provide reinforcement by deformation of the material are shaped out. The sheet-metal walls are subsequently joined together inside these indentations by means of a material-locking or form-locking connection. A heat exchanger made by this method has dimensionally stable walls. Advantageously, the indentations are disposed in a grid, and the grid spacing of connecting points is adapted to the sheet-metal thickness and the properties of the material.

BRIEF DESCRIPTION OF THE DRAWINGS

The invention is described in further detail below in terms of examples shown in the drawings. Shown are

DESCRIPTION OF THE EXEMPLARY EMBODIMENTS

Figure 1:
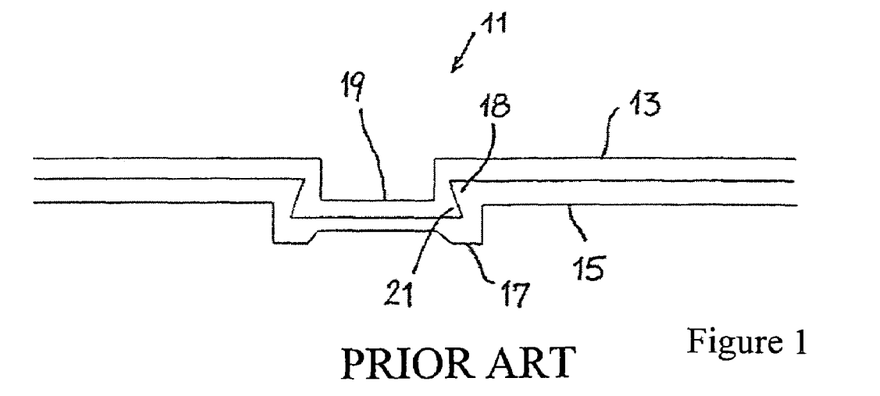
FIG. 1: a schematic section through a fastening point, attained by means of compression molding, between two metal sheets in accordance with the prior art.

The compression-molded connection 11, which is shown in a schematic section in FIG. 1, is in accordance with the prior art and was developed as an alternative to spot welding, especially for the automotive industry. With compression-molded connections 11 of this kind, metal sheets 13, 15 resting flat on one another can be joined within only a few seconds at many places. The connection 11 transmits tension and shear forces. It is produced by pressing compression molds against the metal sheets 13, 15 on both sides. The sheet 13 is everted downward into a counterpart mold by means of the compression mold acting from above in FIG. 1. The lower sheet 15 is made to bulge outward at the bottom simultaneously with the upper sheet 13. The counterpart mold of the downward-acting compression mold has an annular indentation and a central raised portion on the bottom of the mold. The material compressed into the counterpart mold is therefore pressed into this annular indentation and forms an annular thickened portion 17. Several variants of methods for making connections by compression molding with which a comparable result is attained are known.

Although the two compression molds for pressure orientation of the male die have approximately parallel mold walls, a denticulation is created between the two sheets. The lower sheet 15 surrounds the downward-pressed piece of sheet metal 19 of the upper sheet 13 with an indentation edge 18 at a narrower radius than the outer radius of the downward-pressed piece 19. The pressure of the compression process causes the downward-pressed sheet-metal piece 19 to deviate, because it expands crosswise to the pressure direction and thus forms a crown 21 under the lower sheet 15. This crown 21 has a larger radius than the shortest radius of the lower sheet 15 in the deformed region. As a result, the sheets 13, 15 with the crown 21 and indentation edge 18 dig into one another in such a way that as a rule they can be taken apart without harming the sheet.

This deformation can be embodied linearly. To prevent the forces occurring in the crown 21 and the indentation edge 18 as a result of the use of the flat heat exchanger from causing the two sheets 13, 15 from coming loose from one another, the compression-molded connection 11 is advantageously embodied as punctate or annular.

Figure 2:
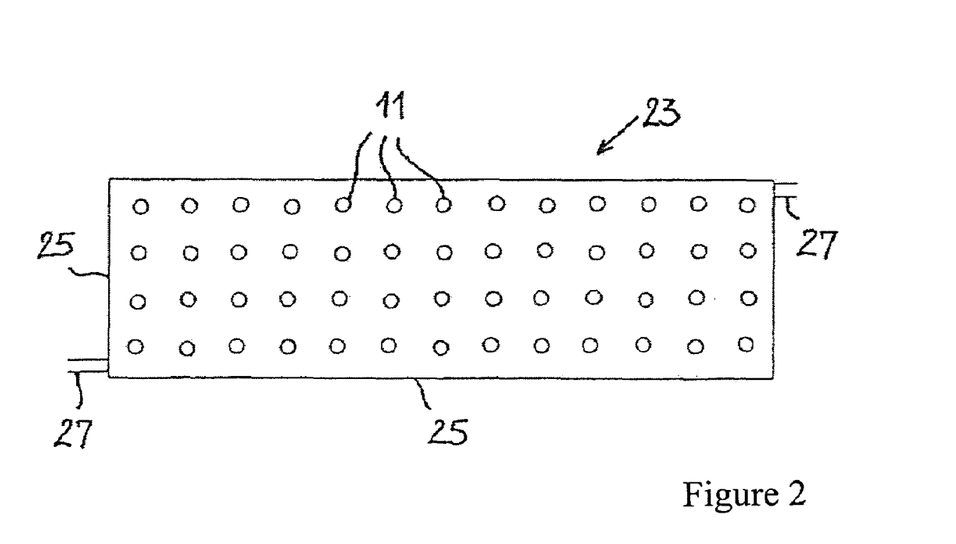
FIG. 2: a schematic drawing of a flat heat exchanger according to the invention.

FIG. 2 shows a solar collector panel 23. Two sheet copper walls 13, 15, only one of which is visible in the drawing, are joined by many punctate compression-molded connections 11. These connections are disposed in a square grid. The edges 25 are traditionally joined and sealed with soldered lock-seams. Pipes 27 are soldered in place on diagonally opposed corners. The sheets 13, 15 were joined together, resting flatly on one another, and even after the collector has been manufactured still rest flatly on one another. The flow-through chamber for a heat transfer medium is not widened, by being put under pressure, until after the collector 23 is finished. The hollow body, made of sheet metal 0.2 mm thick, is inflated with a pressure of four atmospheres, for instance ($4*10^5$ Pa). The sheet metal walls 13, 15 are deformed in the process, and the external dimensions of the hollow body 23 become somewhat smaller, and the flow through chamber is opened.

Figure 3:
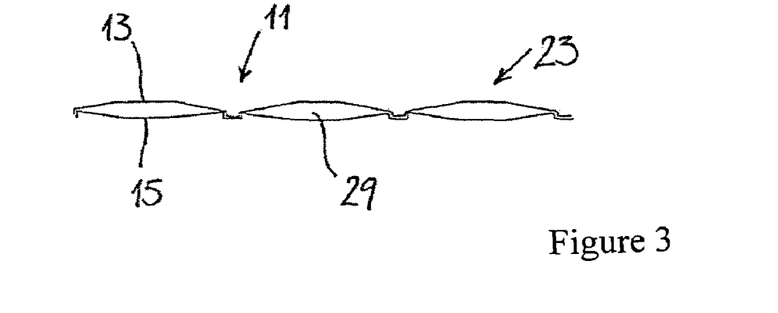
FIG. 3: a schematic section through the fastening points of a flat heat exchanger.

FIG. 3 schematically shows a section through an inflated hollow body 23. At the fastening points 11, the sheet metal walls 13, 15 remain joined and in the closest possible contact. In between, the inflation pressure or test pressure for testing the tightness of the collector element 23 is capable of forcing the walls 13, 15 apart. This creates a flow-through chamber 29 between the walls 13, 15. The flow-through chamber 29 is very small in proportion to the collector area and is present over practically the entire surface. The collector area is cooled directly on the back side at nearly every point. The only exceptions are the compression-molded connection points 11. However, these have a very small diameter, of about 6 mm, so that the heat transfer paths remain very short.

Figure 4:
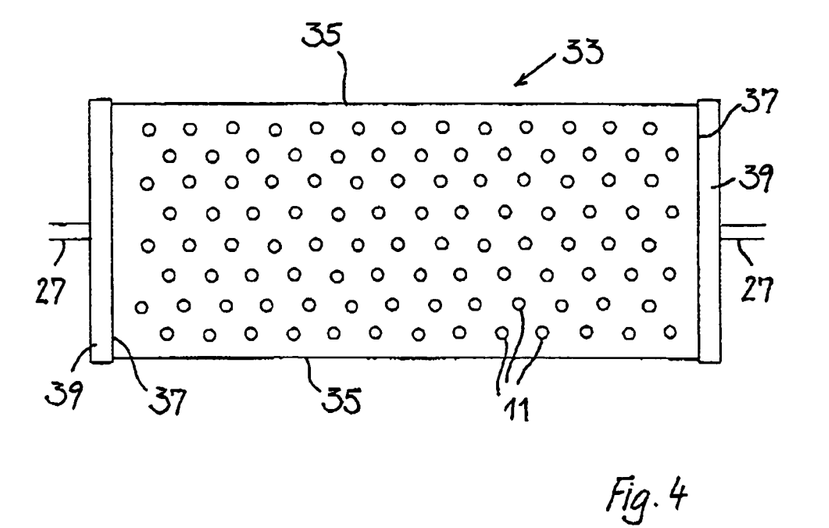
FIG. 4: a heat exchanger comprising one pipe.

FIG. 4 shows a collector or heat exchanger element 33, which is made from a pipe. The edges 35 are correspondingly formed by a bending edge of the pipe. The front and rear wall surfaces between the edges 35 are fastened to one another with many compression-molded connections 11. The edges 37 on the ends of the pipe are each closed off by a respective end piece 39. Supply and discharge lines 27 are connected to the end piece 39, which for instance is a deep-drawn sheet-metal part. The compression-molded connections 11 form a triangular grid. Around each connection point 11, six further connection points 11 are disposed in a practically regular hexagon. If the grid is rotated by a further 30°, for instance, then the flow through the hollow body 33 no longer takes place in conduits that extend rectilinearly from one end to the other; instead, the heat transfer medium must wind around the fastening points 11. This produces better mixing of the cooler medium with the hotter medium.

Figure 5:
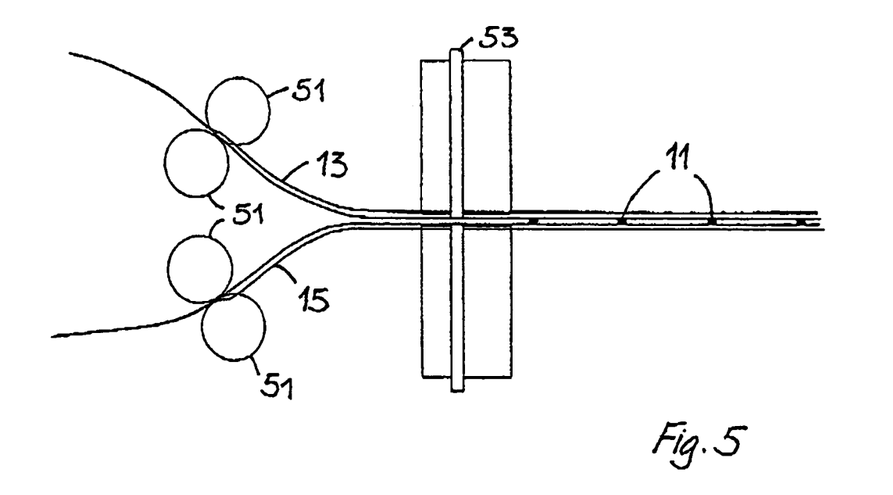
FIG. 5: a schematic illustration of the production of a flat heat exchanger according to the invention, with preshaped metal sheets.

A further possibility for forming the flow-through chamber is to shape the walls beforehand. FIG. 5 schematically shows an arrangement with which the metal sheets are first preshaped and then joined together. By the roller presses 51, two sheet-metal webs 13 and 15 are shaped individually. Next, the webs 13, 15 are joined together. The two webs 13, 15 are joined for that purpose by a male die 53 at the contact points.

Deforming the walls around the fastening points has proved advantageous. With circular indentations and protrusions 59 on the two walls 13 and 15, which indentations are recessed facing and opposite one another, it is attained that the walls 13 and 15 are kept at a spacing from one another that can be determined by the depth of the indentation 59.

Figure 6:
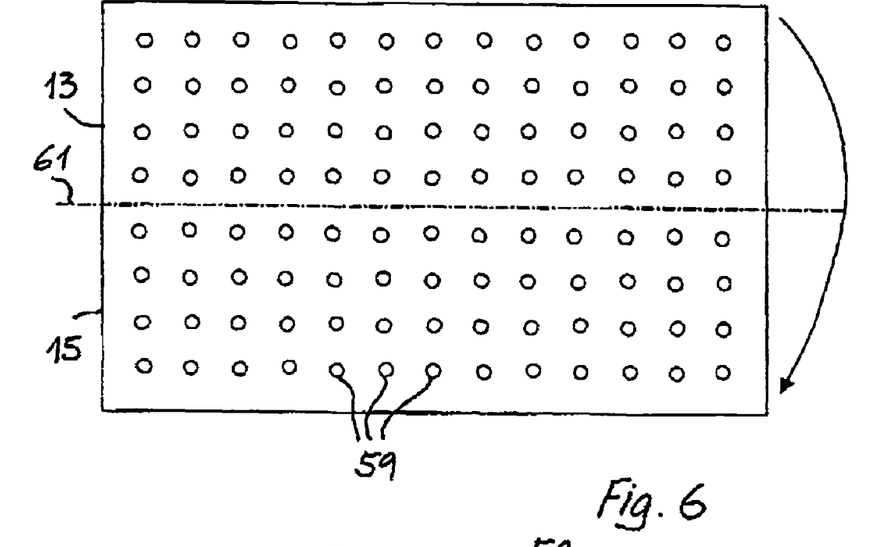
FIG. 6: a schematic illustration of a metal sheet with indentations shaped at the places intended for the fastening points, the indentations being disposed symmetrically to a folding line of the sheet.
Figure 7:
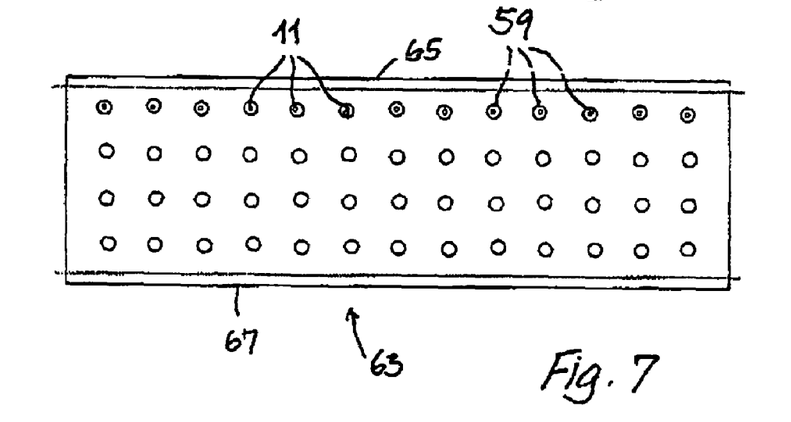
FIG. 7: the sheet of FIG. 6, folded together and partly tacked together by compression-molded connections.

FIG. 6 shows a preshaped sheet which is suitable for being put together (as indicated by the arrow) along the axis of symmetry 61 of the arrangement of thus-preshaped indentations 59. Putting them together along the axis of symmetry 61 causes the indentations 59 each to be in contact with one another. The resultant hollow body 63 is shown in FIG. 7. In the production of flat heat exchangers, the side edges 65 and

Figure 8:
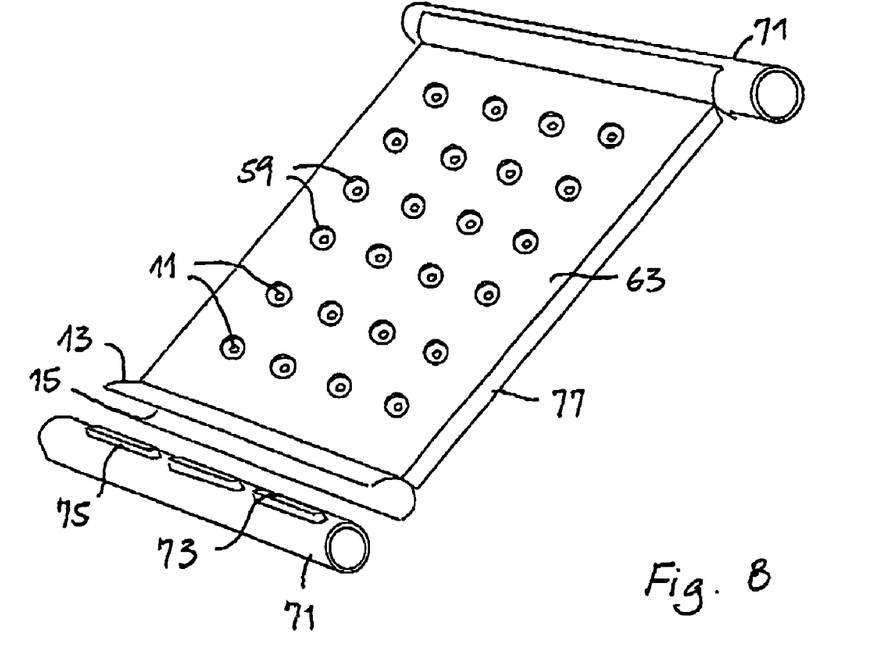
FIG. 8: a flat heat exchanger with end pipes.

67 of this hollow body are then folded over along the dotted line, for instance vertically, and the non-joined side 67 is soldered. The side edge 65 remains closed and tight when the metal sheet is folded together, as seen in FIG. 6, and need not be soldered. On the face end 69, the walls 13 and 15 are widened so that they are capable of receiving end pipes 71 (FIG. 8). After the end pipes have been soldered, the compression-molded connections 11 are each embodied centrally in the indentations 59.

FIG. 8 shows a practically finished flat heat exchanger. To allow the slots 73 in the end pipes 71 to be shown in this view, one end pipe 71 is shown separated from the hollow body 63. The sheet copper walls 13 and 15 are widened to be quarter-round in opposite directions on the face ends of the hollow body 63, so that together they form a channel of approximately semicircular cross section. The end pipe 71 is soldered in place in this channel. A plurality of openings 73 are embodied on the copper end pipe 71. They are located in a line parallel to the axis of the pipe. They are oriented toward the flow-through chamber 29 between the two walls 13 and 15. The openings 73 have cold-drawn collars 75. The collar 75, in the finished heat exchanger, reaches into the flow-through chamber 29 and is soldered to the walls 13, 15 at least in the corner regions of the hollow body 63.

On the side edges 77, the walls 13, 15 are jointly angled approximately perpendicular to the face of the hollow body 63 and form a reinforcement of the hollow body 63. Indentations 59 are provided in the walls 13, 15 that form the face of the hollow body 63. These indentations are disposed in a rectangular grid, spaced 25 mm apart, and have a diameter of 8 mm. The compression-molded connection points 11 are disposed in the middle of the indentations and have a diameter of 6 mm. The depth of the indentations 59 is 1 mm, and the width of the flow-through chamber 29 is accordingly 2 mm. For a heat exchanger with external dimensions of 20*100 cm, this results in a content of 200 ml, or one liter of heat transfer medium per square meter of collector area.

Such heat exchangers can be produced with virtually arbitrary dimensions. Mass-produced designs with standardized dimensions make it possible to place the heat exchangers in line with one another to form a larger area, or to form a packet. By suitable placement of pipes, the individual heat exchangers can be disposed in series or parallel without changing the connections or the shape.

The hollow body 63 can also have an arbitrary, predetermined shape. For instance, if the hollow body is to take the shape of a rain gutter, then two metal sheets 13, 15 are shaped parallel, and a double-walled gutter is produced. After that, the sheet-metal walls 13, 15 are joined at the connection points 11 and at the edges. Thus the heat exchanger can have a virtually arbitrary shape.

Figure 9:
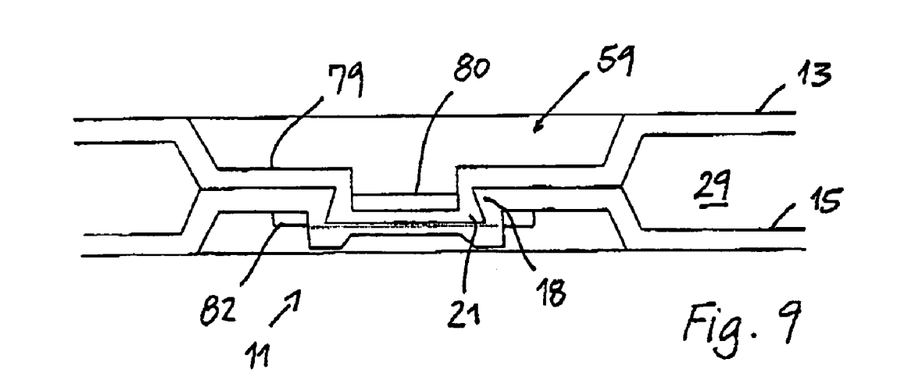
FIG. 9: a cross section through a compression molding point in the heat exchanger of FIG. 8.

FIG. 9 shows a cross section through a connection point 11 with an indentation 59 and a compression-molded connection. At the connection points, the metal sheets 13 and 15 that form the wall of the heat exchanger are shaped to be circular. The deformation 59 forms an indentation on one side and a protrusion on the other side of the sheet 13, 15, with a connection face 79 parallel to the rest of the sheet-metal surface. The increased surface area of the protrusion forms a bearing face for the second sheet (13, 15) to rest on. It is raised by 1 mm or at most 1.5 to 2 mm past the rest of the wall. Such deformations can be machined into the sheet metal on a mass-production basis by means of roller presses or by means of individual presses. This deformed face is advantageously pressed in and with a torque exerted on the face reinforces the material connection face 79. The reinforced material of two sheets, placed back to back on one another with the deformed connecting faces 79, can now be joined, either by means of a compression molding point as shown or by some other type of connection located centrally inside this indented connection face 79. The indentations 59 assure a defined flow-through chamber 29 and, in conjunction with a gridlike arrangement of the deformations and a maximum spacing of the connection points 11, they also assure a dimensionally stable surface of the heat exchanger.

The compression-molded connection 11 in FIG. 9 is additionally equipped with parts 80, 82 that secure the connection. These parts 80, 82 are of brass, since it is harder than copper and has a lower coefficient of temperature-dependent expansion. A disk 80 is press-fitted into the stamped-in indentation in the compression-molded connection 11, and a ring 82 surrounds the eversion, or toothed place, pressed into the female die, of the compression-molded connection 11. The disk and the ring together secure the interlocking between the indentation edge 18 and the crown 21. This stabilization of the compression-molded connection allows higher loading in terms of temperature fluctuation and assures a stronger connection force. It can expediently be employed in high-pressure heat exchangers or in heat exchangers with temperature differences.

Figure 10:
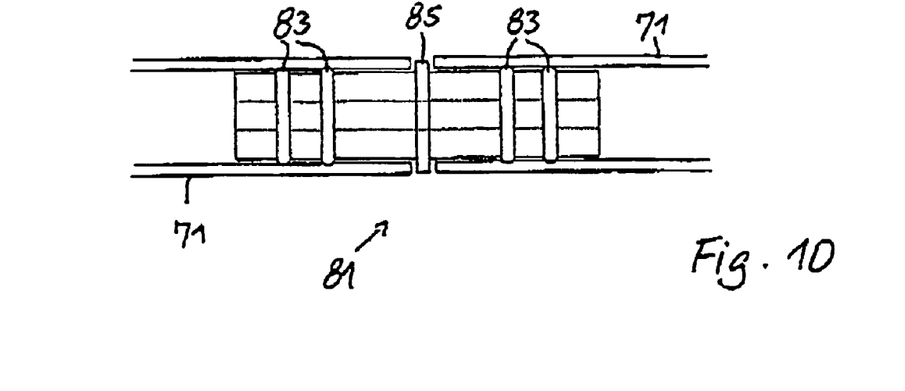
FIG. 10: a plug connector for connecting the flat heat exchanger of FIG. 8.

The connection between the heat exchanger and the forward and reverse flow lines or the adjacent heat exchanger is advantageously accomplished via plug connectors. One such plug connector is shown in FIG. 10. The plug connector 81 comprises a pipe. This pipe is provided with two encompassing grooves, one on each of its two ends, in each of which grooves an O-ring 83 is located. The dimensions of the outside diameter and of the O-ring of the plug connector are adapted to the inside diameter of the pipe, that is, the end pipe, to be joined. To allow the plug connector 81 to be inserted uniformly into the two pipe ends to be joined, a stop 85 is provided in the middle. This stop is formed by an enlargement of the diameter.

Figure 11:
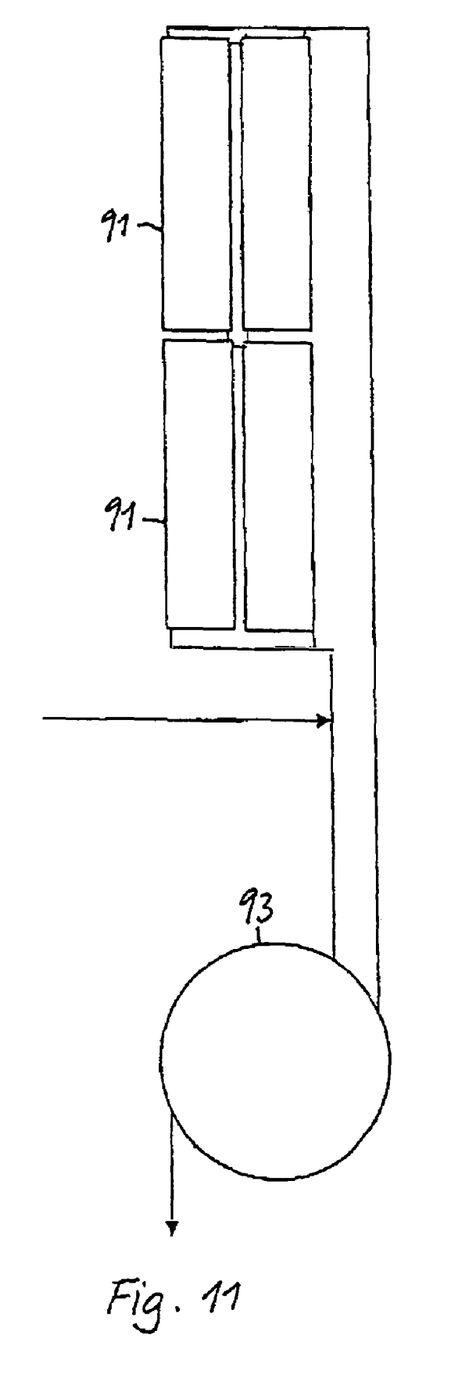
FIG. 11: a simple water heating system.
Figure 12:
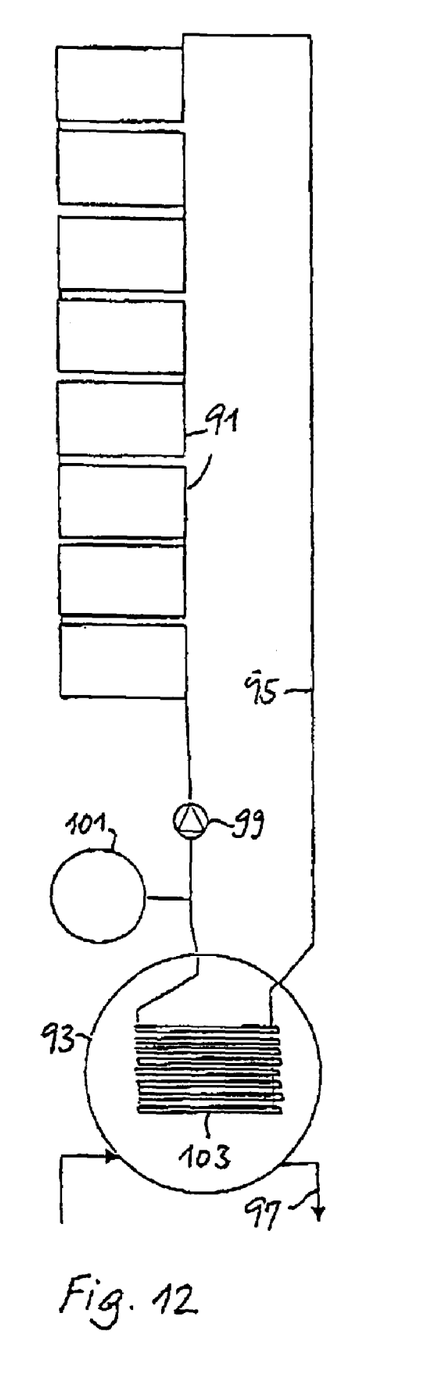
FIG. 12: a water heating system with a pump, hot-water tank, and expansion vessel.

FIG. 11 shows a simple water heating system with four joined-together solar collector elements 91 and a hot-water reservoir 93. The tap water is heated directly in the collectors 91. The reservoir 93 is connected in a circulatory system to the collectors 91. An even simpler variant makes do without a hot-water reservoir 93. FIG. 12 shows a more-complicated water heating system, in which the collector circuit 95 is separate from the tap water circuit 97. The collector circuit 95 is driven by a pump 99. It has an expansion vessel 101. A heat exchanger register 103 is disposed in the hot-water tank, and with the register the water, heated in the collectors 91, passes its heat on to the tap water. It can also be seen from FIGS. 11 and 12 that the most various arrangements of collector elements 91 are possible.

The invention claimed is:

1. A compression-molding sheet-metal joining method for producing a heat exchanger having a flow-through chamber for a heat transfer medium, comprising:
   providing two sheet-copper walls;
   shaping out indentations providing reinforcement by deformation of both sheet-copper walls;
   disposing the two sheet-copper walls facing one another, the indentations in the sheet-copper walls being back-to-back to one another and in contact with each other, defining a plurality of connecting points; and
   punctate fastening the two walls to one another at the connecting points by compression molding annular denticulations inside the indentations with spacing on all sides from an edge thereof, the annular denticulations forming a positive engagement of the two sheet-copper walls with each other.

2. The method of claim 1, wherein at least one wall comprises sheet copper with a thickness of from 0.3 to 0.8 mm.

3. A process for forming a flow-through chamber for a heat transfer medium according to the method of claim 1, wherein the denticulations are disposed with a mutual spacing between the denticulations of from 10 to 50 mm.

4. The method of claim 1, wherein the denticulations are disposed in at least one of rows and in a grid pattern.

5. The method of claim 2, wherein the thickness is from 0.5 to 0.65 mm.

6. The process of claim 3, wherein the mutual spacing between denticulations is between 20 and 30 mm.

* * * * *